United States Patent
Yokoyama et al.

(10) Patent No.: US 10,962,051 B2
(45) Date of Patent: Mar. 30, 2021

(54) BEARING DEVICE AND ROTARY MACHINE

(71) Applicant: Mitsubishi Hitachi Power Systems, Ltd., Kanagawa (JP)

(72) Inventors: Shimpei Yokoyama, Tokyo (JP); Tadasuke Nishioka, Tokyo (JP); Chihiro Yoshimine, Tokyo (JP); Yuichiro Waki, Yokohama (JP); Yuki Sumi, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 0 days.

(21) Appl. No.: 16/486,901

(22) PCT Filed: Sep. 6, 2017

(86) PCT No.: PCT/JP2017/032091
§ 371 (c)(1),
(2) Date: Aug. 19, 2019

(87) PCT Pub. No.: WO2018/154815
PCT Pub. Date: Aug. 30, 2018

(65) Prior Publication Data
US 2020/0232502 A1 Jul. 23, 2020

(30) Foreign Application Priority Data

Feb. 23, 2017 (JP) ................. JP2017-031737

(51) Int. Cl.
*F16C 17/03* (2006.01)
(52) U.S. Cl.
CPC .......... *F16C 17/03* (2013.01); *F16C 2360/23* (2013.01)

(58) Field of Classification Search
CPC ........ F16C 17/02; F16C 17/03; F16C 17/035; F16C 32/0666
See application file for complete search history.

(56) References Cited

U.S. PATENT DOCUMENTS 3,711,169 A * 1/1973 Gardner ............... F16C 17/03
384/309
8,834,032 B2 * 9/2014 Suzuki ............... F16C 17/03
384/311
(Continued)

FOREIGN PATENT DOCUMENTS

EP 2402621 1/2012
JP 2005-344899 12/2005
(Continued)

OTHER PUBLICATIONS

International Search Report dated Nov. 7, 2017 in corresponding International (PCT) Application No. PCT/JP2017/032091, with English translation.
(Continued)

*Primary Examiner* — James Pilkington
(74) *Attorney, Agent, or Firm* — Wenderoth, Lind & Ponack, L.L.P.

(57) ABSTRACT

A support part supports a bearing pad from an outer circumferential side so as to be swingable at a pivot position. A radius of curvature of a rotary shaft is Rj, a radius of curvature of a pad surface is Rp, and a radius of curvature of a reference circle centered at an axial line and having a radius equal to a distance between a center and the pivot position on the pad surface is Rb, and a relationship of Rj<Rp<Rb is established.

6 Claims, 5 Drawing Sheets

(56) References Cited

U.S. PATENT DOCUMENTS

| | | | |
|---|---|---|---|
| 10,359,072 B2* | 7/2019 | Yoshimine | F01D 25/18 |
| 2010/0220944 A1 | 9/2010 | Waki et al. | |
| 2013/0028731 A1* | 1/2013 | Mimura | F16C 17/03 |
| | | | 415/229 |
| 2016/0169276 A1 | 6/2016 | Nishioka | |

FOREIGN PATENT DOCUMENTS

| | | | |
|---|---|---|---|
| JP | 2010-203481 | | 9/2010 |
| JP | 2013-19482 | | 1/2013 |
| KR | 10-2011-0095428 | | 8/2011 |
| WO | 2008/126362 | | 10/2008 |
| WO | 2016/080000 | | 5/2016 |
| WO | WO2016084937 | * | 6/2016 |

OTHER PUBLICATIONS

Written Opinion of the International Searching Authority dated Nov. 7, 2017 in corresponding International (PCT) Application No. PCT/JP2017/032091, with English translation.

* cited by examiner

BEARING DEVICE AND ROTARY MACHINE

CROSS-REFERENCE TO RELATED APPLICATION

Priority is claimed from Japanese Patent Application No. 2017-31737, filed on Feb. 23, 2017, the content of which is incorporated herein by reference.

TECHNICAL FIELD

The present invention relates to a bearing device and a rotary machine.

BACKGROUND ART

A bearing device used for a steam turbine, a gas turbine, a compressor, and the like (see, for example, Japanese Unexamined Patent Application, First Publication No. 2010-203481) is known. The bearing device is provided with a plurality of bearing pads spaced apart in the circumferential direction of a rotary shaft.

A tilting pad bearing is known as the bearing device. In the tilting pad bearing, each bearing pad is pivotably supported by a pivot (support part) from an outer circumferential side. An oil film of a lubricant is formed between the rotary shaft and the pad surface.

DISCLOSURE OF INVENTION

Technical Problem

The load-supporting bearing pad undergoes elastic deformation and thermal deformation particularly in the tilting pad bearing of high surface pressure having a large load on the pad surface from the rotary shaft and high circumferential speed having a large rotary shaft rotation speed. Accordingly, the radius of curvature of the pad surface of each bearing pad increases as compared with the radius of curvature during processing. In other words, the curved pad surface is deformed so as to open.

Once the gap between the rotary shaft and the pad surface becomes large as a result, load capability reduction (high metal temperature, small oil film thickness) and damping performance reduction arise. Further, the flow rate of the lubricant required by the pad surface increases. Accordingly, a decline in performance as a bearing device arises.

The present invention has been made in view of the above problems, and an object of the present invention is to provide a bearing device and a rotary machine capable of maintaining performance during operation.

Solution to Problem

A bearing device according to a first aspect of the present invention includes a bearing pad having a pad surface supporting, via an oil film, an outer circumferential surface of a rotary shaft configured to rotate around an axial line and a support part supporting the bearing pad from an outer circumferential side so as to be swingable at a pivot position. A relationship of $Rj<Rp<Rb$ is established when a radius of curvature of the rotary shaft is $Rj$, a radius of curvature of the pad surface is $Rp$, and a radius of curvature of a reference circle centered at the axial line and having a radius equal to a distance between the center and the pivot position on the pad surface is $Rb$.

Here, in a case where the radius of curvature of the pad surface is the same as the reference circle, elastic deformation and thermal deformation arise on the pad surface during operation and deformation occurs such that curvature opens. Once the radius of curvature of the pad surface exceeds the radius of curvature of the reference circle as a result, the dimension of the gap between the pad surface and the rotary shaft becomes excessive and performance as a bearing declines.

In the present invention, the radius of curvature of the pad surface is formed so as to be smaller than the reference circle from the beginning, and thus it is possible to suppress opening beyond the reference circle even in the event of elastic deformation and thermal deformation. In addition, the radius of curvature of the pad surface is larger than the radius of curvature of the rotary shaft, and thus it is possible to form an appropriate gap with the rotary shaft even in the initial stage of the operation free from elastic deformation and thermal deformation.

In the bearing device according to a second aspect of the present invention, a dimension of a gap between the pad surface and the outer circumferential surface of the rotary shaft is the maximum at the pivot position.

The pivot position of the pad surface is supported by the support part from the outer circumferential side. Accordingly, the pivot position is unlikely to be affected by elastic deformation and thermal deformation of the bearing pad and the dimension of the gap with the rotary shaft hardly changes. The bearing pad becomes more likely to be deformed by being affected by elastic deformation and thermal deformation as the bearing pad moves away from the pivot position. Accordingly, it is possible to optimize the gap during the operation as the entire bearing pad by maximizing the dimension of the gap with the rotary shaft at the pivot position.

In the bearing device according to a third aspect of the present invention, the dimension of a gap between the pad surface and the outer circumferential surface of the rotary shaft gradually decreases as the distance increases from the pivot position in a circumferential direction.

The part of the bearing pad circumferentially away from the pivot position is more likely to be deformed by being affected by elastic deformation and thermal deformation. Accordingly, it is possible to further optimize the gap during the operation as the entire bearing pad by the gap dimension with the rotary shaft being reduced with circumferential separation from the pivot position.

The bearing device according to a fourth aspect of the present invention may further include a guide metal having a guide surface extending along the reference circle. A dimension of a gap between the guide metal and the outer circumferential surface of the rotary shaft may be equal to a dimension of a gap between the outer circumferential surface of the rotary shaft and the pad surface at the pivot position.

The gap between the guide surface and the rotary shaft and the rotary shaft and the pad surface at the pivot position are allowed to be the same and the gaps are used as a reference. By the gap at a part other than the pivot position on the pad surface being smaller than the reference, it is possible to more appropriately manage the gap as the entire bearing pad during the operation.

In the bearing device according to a fifth aspect of the present invention, the pivot position may be positioned closer to a front side in a rotation direction of the rotary shaft than a center of the pad surface in a circumferential direction and a relationship of $Rp1<Rp2$ may be established when a radius of curvature of an upstream side pad surface as a part on the pad surface closer to a rear side in the rotation direction than the pivot position is Rp1 and a radius of curvature of a downstream side pad surface as a part on the pad surface closer to the front side in the rotation direction than the pivot position is Rp2.

The pad surface becomes more likely to be deformed and opened as the bearing pad is circumferentially separated from the pivot position. Accordingly, it is possible to avoid extreme opening of the upstream side pad surface by allowing the radius of curvature of the downstream side pad surface having a small distance from the pivot position to the circumferential end part to exceed the radius of curvature of the upstream side pad surface having a large distance from the pivot position to the circumferential end part.

In the bearing device according to a sixth aspect of the present invention, two the bearing pads are provided at different circumferential positions and the relationship of RpA<RpB is established when the radius of curvature of one of the two bearing pads having a larger load from the rotary shaft is RpA and the radius of a curvature of the other bearing pad having a smaller load from the rotary shaft is RpB.

In a case where a plurality of the bearing pads are provided, one to which a larger load is applied undergoes more elastic deformation and thermal deformation. Accordingly, by setting the radius of curvature of the bearing pad larger in load so as to be smaller than the radius of curvature of the bearing pad with a relatively small load, it is possible to more appropriately manage the gap between the rotary shaft and the bearing pad as the entire bearing device.

A bearing device according to a seventh aspect of the present invention includes the rotary machine, the rotary shaft and the bearing device according to any one of the above supporting the rotary shaft so as to be rotatable around the axial line.

The performance of the rotary machine configured as described above can be maintained during the operation.

Advantageous Effects of Invention

According to the present invention, performance can be maintained during operation.

BEST MODE FOR CARRYING OUT THE INVENTION

First Embodiment

Figure 1:
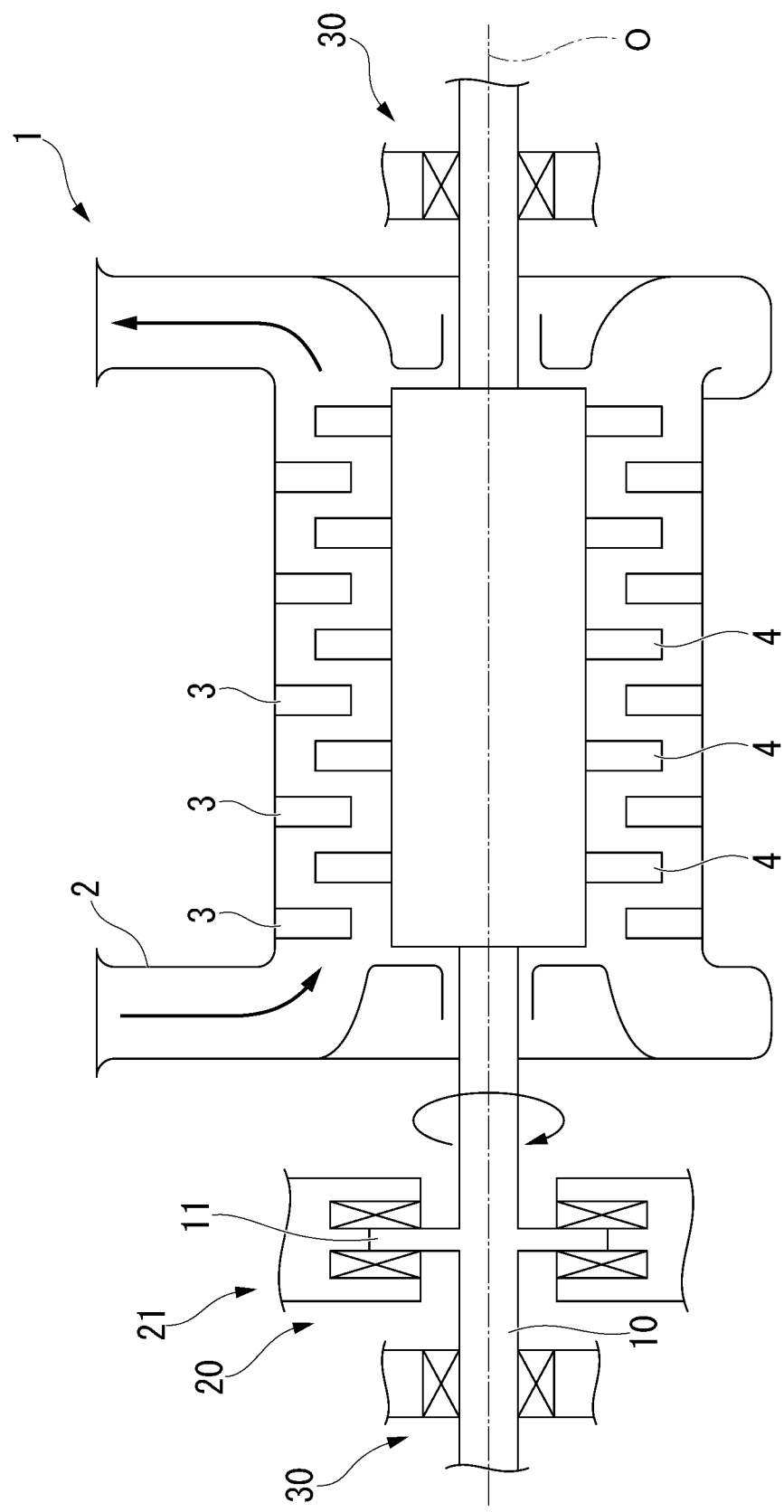
FIG. 1 is a schematic longitudinal cross-sectional view of a steam turbine provided with a journal bearing according to a first embodiment.

Hereinafter, a first embodiment according to the present invention will be described with reference to FIGS. 1 to 4. As shown in FIG. 1, a steam turbine 1 (rotary machine) according to the first embodiment of the present invention is an external combustion engine that takes out steam energy as rotational power and is used for a generator or the like in a power plant.

The steam turbine 1 is provided with a turbine casing 2, a rotary shaft 10 extending along an axial line O so as to penetrate the turbine casing 2, a stator vane 3 held by the turbine casing 2, a rotor blade 4 provided on the rotary shaft 10, and a bearing part 20 supporting the rotary shaft 10 so as to be rotatable around the axial line O.

The bearing part 20 is provided with a thrust bearing 21 and a journal bearing 30 (bearing device) and rotatably supports the rotary shaft 10.

The rotary shaft 10 has a columnar shape extending about the axial line O. The rotary shaft 10 extends in the axial line O direction with respect to the turbine casing 2. A thrust collar 11 is formed at a part of the rotary shaft 10. The thrust collar 11 has a disk shape about the axial line O and integrally protrudes outward in the radial direction of the rotary shaft 10 from the main body of the rotary shaft 10 so as to have a flange shape. The thrust bearing 21 slidably supports the thrust collar 11 from both sides in the axial line O direction.

In the steam turbine 1, steam introduced into the turbine casing 2 passes through the flow path between the stator vane 3 and the rotor blade 4. At this time, the steam rotates the rotor blade 4. As a result, the rotary shaft 10 rotates along with the rotor blade 4 and power (rotational energy) is transmitted to a machine such as a generator connected to the rotary shaft 10.

Figure 2:
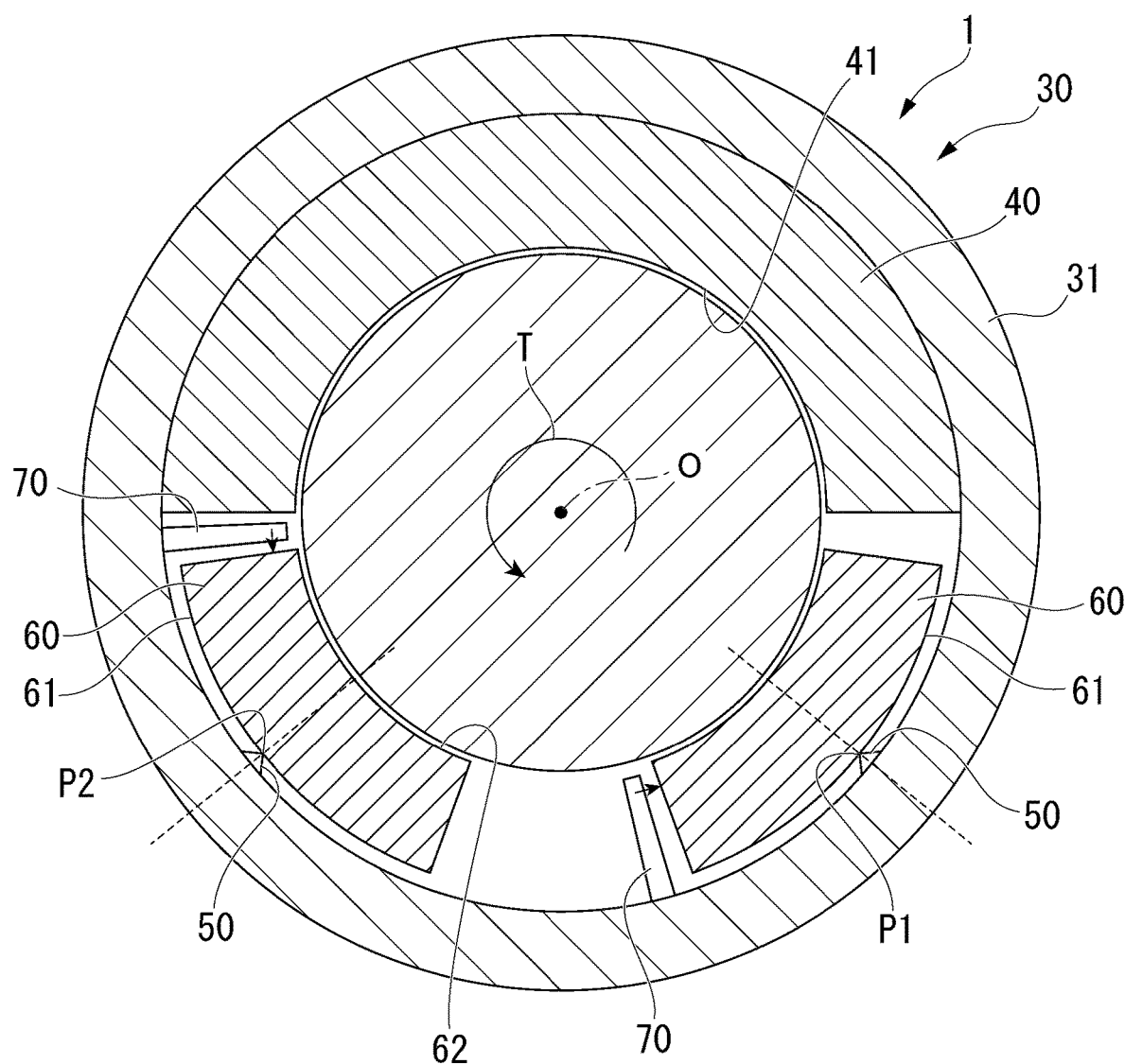
FIG. 2 is a cross-sectional view orthogonal to an axial line of the journal bearing according to the first embodiment.

Next, the journal bearing 30, which is the bearing device of the first embodiment, will be described with reference to FIG. 2.

The journal bearing 30 is provided with a carrier ring 31, a guide metal 40, a pivot 50 (support part), a bearing pad 60, and a lubricant supply nozzle 70.

The carrier ring 31 is a tubular member surrounding the rotary shaft 10 from an outer circumferential side. The carrier ring 31 is configured by, for example, two members separated into upper and lower half parts being coupled by means of bolting or the like. The carrier ring 31 has a cylindrical central axial line coinciding with the axial line O described above. A space is formed between the carrier ring 31 and the outer circumferential surface of the rotary shaft 10.

The guide metal 40 is fixed to the upper half part of the inner circumferential surface of the carrier ring 31. The guide metal 40 does not support the load of the rotary shaft 10. The guide metal 40 is provided so that the rotary shaft 10 is prevented from jumping up.

The guide metal 40 is a circular arc-shaped member extending in a circumferential direction on the inner circumferential surface of the carrier ring 31. The outer circumferential surface of the guide metal 40 is fixed to the carrier ring 31. The inner circumferential surface of the guide metal 40 is a facing surface 41 facing the outer circumferential surface of the rotary shaft 10 with a gap. The facing surface 41 of the guide metal 40 has a circular arc shape about the axial line O when viewed from the axial line O direction. A plurality (for example, a pair) of the guide metals 40 are provided at intervals in the axial line O direction.

A pair of the pivots 50 are provided at intervals in the circumferential direction at the lower half part of the inner circumferential surface of the carrier ring 31. The pivot 50 is formed so as to protrude from the inner circumferential surface of the carrier ring 31. The tip of the pivot 50, that is, the radially inner end part of the pivot 50 has a hemispheric surface shape. The pivot 50 has a role of pivotably supporting the bearing pad 60.

The same number of the bearing pads 60 as the pivots 50 are provided so as to correspond to the pivots 50, at different circumferential positions, and at intervals in the circumferential direction of the rotary shaft 10. Each bearing pad 60 has a circular arc shape in a cross-sectional view orthogonal to the axial line O of the rotary shaft 10 and has a curved plate shape with a uniform radial dimension.

The radially outward outer circumferential surface of the bearing pad 60 is a back surface 61 supported by the tip of the pivot 50. The tip of the pivot 50 is hemispherical, and thus the bearing pad 60 is swingable about the tip of the pivot 50 as a fulcrum. As a result, a so-called tilting mechanism is configured. The point of the back surface 61 of the bearing pad 60 that is supported by the pivot 50 is a pivot point P1 coming into point contact.

The inner circumferential surface of the bearing pad 60 is a pad surface 62 facing the rotary shaft 10. By a lubricant being interposed between the pad surface 62 and the rotary shaft 10, the pad surface 62 slidably supports the outer circumferential surface of the rotary shaft 10 via the lubricant. The pad surface 62 has a circular arc shape concave radially outward when viewed from the axial line O direction and extends in the axial line O direction while maintaining the circular arc shape.

The outer circumferential side part of the bearing pad 60 is a base part formed of a steel material or the like. A white metal is laminated on the inner circumferential side of the base part. The pad surface 62 is formed of a white metal.

The lubricant supply nozzle 70 has a role of supplying a lubricant between the bearing pad 60 and the rotary shaft 10. The lubricant supply nozzle 70 is provided on a rear side in a rotation direction T (a rear side in a rotation direction) of the rotary shaft 10 in each bearing pad 60. The lubricant supply nozzle 70 discharges a lubricant supplied from the outside toward a front side in the rotation direction T.

Figure 3:
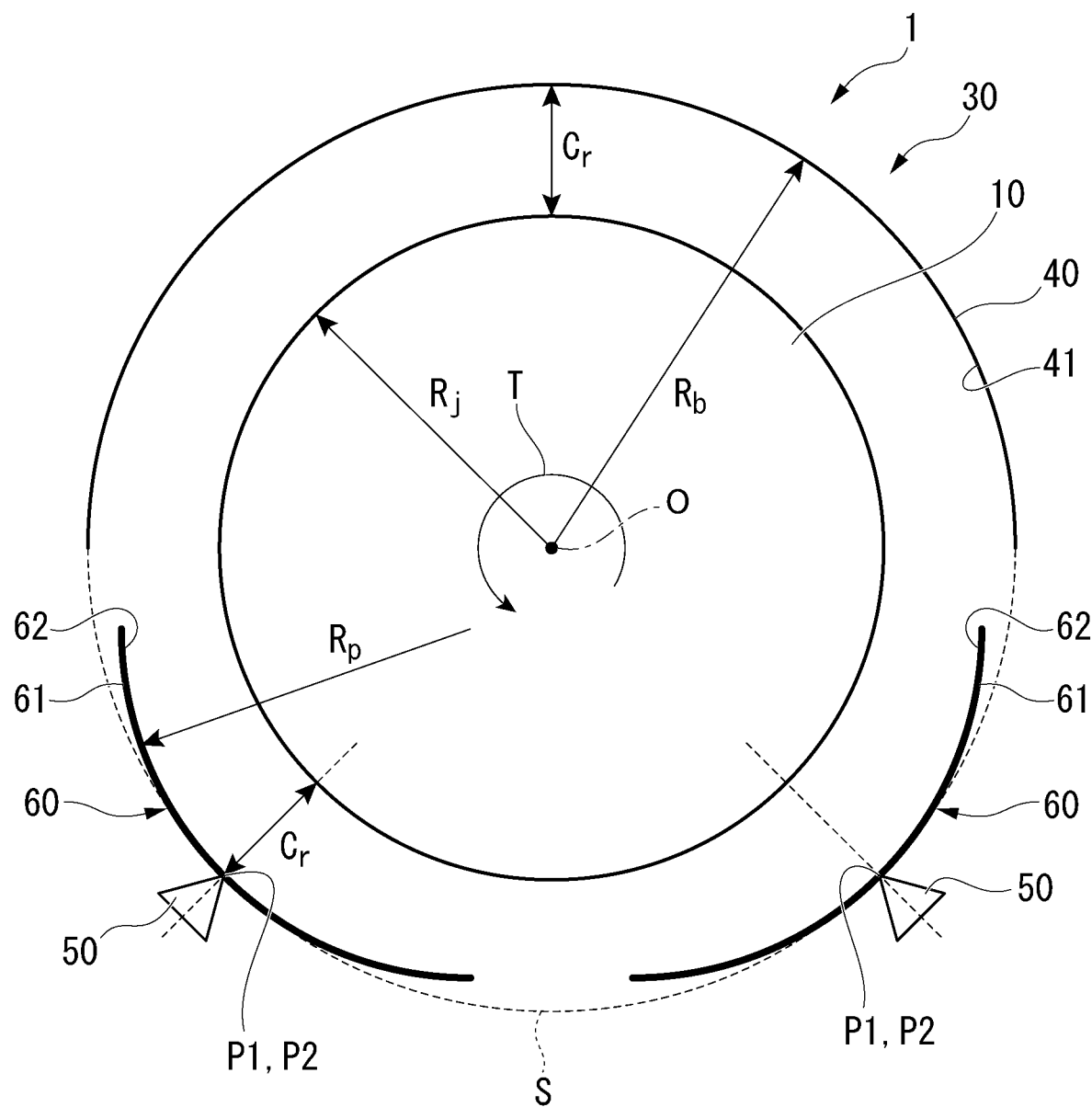
FIG. 3 is a schematic cross-sectional view orthogonal to the axial line of the journal bearing according to the first embodiment.

Here, details of the journal bearing 30 of the first embodiment will be described with reference to FIG. 3, which is a schematic diagram.

When the radius of curvature of the facing surface 41 of the guide metal 40 is Rb, the facing surface 41 of the guide metal 40 extends with the radius of curvature Rb throughout the circumferential direction. The center of the radius of curvature Rb of the guide metal 40 coincides with the axial line O.

The radius of curvature of the rotary shaft 10 is Rj. The center of the radius of curvature Rj of the rotary shaft 10 coincides with the axial line O. Accordingly, a radial gap Cr is formed over the entire facing range in the circumferential direction between the facing surface 41 of the guide metal 40 and the outer circumferential surface of the rotary shaft 10.

A pivot position P2 is the point that corresponds to the pivot point P1 on the pad surface 62 of the bearing pad 60. In other words, of the pad surface 62 and the outer circumferential surface of the bearing pad 60, the same circumferential ratio positions are points corresponding to each other. For example, when the pivot point P1 is at the 60% position of the full length of the back surface 61 of the bearing pad 60 from the front side in the rotation direction T (a front side in the rotation direction), the 60% position from the front side in rotation direction T on the pad surface 62 of the bearing pad 60 is the pivot position P2. As shown in FIG. 3, when the bearing pad 60 is schematically drawn as a line segment without thickness, the pivot point P1 and the pivot position P2 become the same point.

The gap between the outer circumferential surface of the rotary shaft 10 and the pad surface 62 at the pivot position P2 is set so as to be the same as the gap between the facing surface 41 of the guide metal 40 and the outer circumferential surface of the rotary shaft 10. In other words, the gap is set to the gap Cr. The gap Cr corresponds to an assembly gap as a gap at a time of assembly. In other words, during assembly, the gap between the bearing pad 60 and the rotary shaft 10 at the pivot position P2 and the gap between the guide metal 40 and the rotary shaft 10 are set so as to become the same gap Cr.

The radius of curvature of the pad surface 62 is Rp. The central position of the radius of curvature Rp of the pad surface 62 is disposed offset from the axial line O without coinciding with the axial line O of the rotary shaft 10. In the first embodiment, the center of the radius of curvature Rp of the pad surface 62 of the bearing pad 60 is positioned offset below the axial line O and to the respective bearing pad 60 sides.

Here, a reference circle S is a circle centered at an axial line O and having a radius equal to the distance between the axial line O and the pivot position P2 on the pad surface 62. In the first embodiment, the facing surface 41 of the guide metal 40 matches the reference circle S, and the radius of curvature of a reference surface is Rb similarly to the guide metal 40. In other words, the radius of curvature of the facing surface 41 of the guide metal 40 is set so as to coincide with the radius of curvature of the reference circle S.

Here, in the first embodiment, the relationship of Rj<Rp<Rb is established by the radius of curvature Rj of the outer circumferential surface of the rotary shaft 10, the radius of curvature Rp of the pad surface 62, and the radius of curvature Rb of the reference circle S (guide metal 40).

In addition, the dimension of the gap between the pad surface 62 and the outer circumferential surface of the rotary shaft 10 is the maximum at the pivot position P2 when viewed from the axial line O direction. In other words, the gap Cr at the pivot position P2 is the maximum gap dimension between the pad surface 62 and the outer circumferential surface of the rotary shaft 10.

Further, the gap dimension between the pad surface 62 and the outer circumferential surface of the rotary shaft 10 gradually decreases with circumferential separation from the pivot position P2. Accordingly, the pad surface 62 approaches the outer circumferential surface of the rotary shaft 10 from the pivot position P2 toward the front side in the rotation direction T or the rear side in the rotation direction T. In other words, the pad surface 62 is shaped so as to be more closed in the degree of curvature than the reference circle S.

Both the radius of curvature and gap settings described above pertain to design and assembly (non-operation) occasions.

Figure 4:
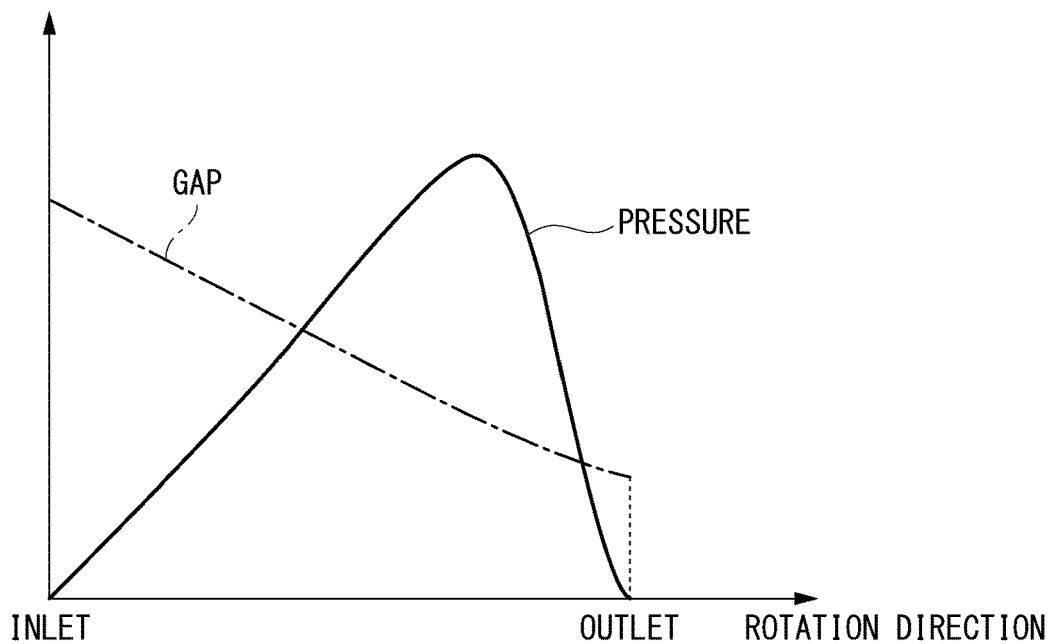
FIG. 4 is a graph showing a gap change and a pressure change at the gap between a bearing pad and the outer circumferential surface of a rotary shaft, in which the horizontal axis represents a position in a rotation direction and the vertical axis represents the size of the gap or the pressure.

Next, the action and effect of the journal bearing 30 of the first embodiment will be described. A lubricant is supplied from the lubricant supply nozzle 70 when the rotary shaft 10 is rotated, that is, when the steam turbine 1 is operated. As a result, an oil film is formed between the pad surface 62 of the bearing pad 60 and the outer circumferential surface of the rotary shaft 10. Pressure attributable to the load caused by the rotary shaft 10 being supported results from the oil film on the bearing pad 60. The pressure is generated as in the graph that is shown in FIG. 4. In other words, when an appropriate gap is formed between the bearing pad 60 and the rotary shaft 10, the gap gradually reduced from a lubricant inlet side to a lubricant outlet side, that is, toward the front side in the rotation direction T. The pressure caused by the rotary shaft 10 being supported gradually increases from the inlet, reaches a peak on the rear side of the pivot point P1, and then decreases toward the outlet.

Here, a high surface pressure is applied to the bearing pad 60 in a case where the load received from the rotary shaft 10 is large in particular. In addition, heat input attributable to friction is large in the case of a large rotation speed.

In such cases, elastic deformation and thermal deformation occur in the bearing pad 60 supporting the load of the rotary shaft 10. Such deformation is deformation in the direction in which the pad surface 62 of the bearing pad 60 opens, that is, deformation leading to an increase in the radius of curvature of the pad surface 62 as viewed from the axial line O direction.

In a case where the radius of curvature of the pad surface 62 is given the same value as the reference circle S similarly to the guide metal 40, the radius of curvature of the pad surface 62 becomes larger than the reference circle S due to the deformation. In other words, the dimension of the gap between the pad surface 62 and the rotary shaft 10 becomes larger than an originally intended value. Load capability reduction and damping performance reduction arise as a result. Further, the flow rate of the lubricant required by the pad surface 62 increases.

In the first embodiment, in contrast, the relationship of $Rj<Rp<Rb$ is established by the radius of curvature Rj of the outer circumferential surface of the rotary shaft 10, the radius of curvature Rp of the pad surface 62, and the radius of curvature Rb of the reference circle S (guide metal 40).

In other words, in the first embodiment, the radius of curvature of the pad surface 62 is formed so as to be smaller than the reference circle S from the beginning of design and assembly, and thus it is possible to suppress opening beyond the reference circle S even in the event of elastic deformation and thermal deformation. As a result, an appropriate gap can be maintained between the pad surface 62 and the rotary shaft 10 even during the operation and a high surface pressure can be realized. In other words, a gap corresponding to the related art can be maintained even during the operation.

In addition, the radius of curvature of the pad surface 62 is larger than the radius of curvature of the rotary shaft 10, and thus it is possible to form an appropriate gap with the rotary shaft 10 even in the initial stage of the operation free from elastic deformation and thermal deformation.

From the above, the performance of the journal bearing 30 can be maintained during the operation.

Here, the point of the pivot position P2 of the pad surface 62 is supported by the pivot 50 from the outer circumferential side, and thus is unlikely to be affected by elastic deformation and thermal deformation. Accordingly, the dimension of the gap with the rotary shaft 10 hardly changes even during the operation.

The bearing pad 60 becomes more likely to be deformed by being affected by elastic deformation and thermal deformation as the bearing pad 60 moves away from the pivot position P2 in the circumferential direction. In other words, the likelihood of deformation increases as the bearing pad 60 moves away from the pivot position P2 of firm support.

In the first embodiment, the dimension of the gap with the rotary shaft 10 at the pivot position P2 is the maximum, and thus the gap with the rotary shaft 10 at a point away from the pivot position P2 is smaller than at the pivot position P2. Accordingly, when deformation has occurred, it is possible to suppress the point of the pad surface 62 away from the pivot position P2 being excessively separated from the rotary shaft 10. Accordingly, it is possible to appropriately manage the gap with the rotary shaft 10 as the entire pad surface 62 and optimize the gap in the entire bearing pad 60 during the operation.

In the first embodiment in particular, the gap dimension with the rotary shaft 10 decreases with circumferential separation from the pivot position P2. Accordingly, the gap during the operation can be further optimized as the entire bearing pad 60 by the rotary shaft 10 being approached during non-operation as the part significantly separated from rotation due to the deformation during the operation.

In the first embodiment, the gap between a guide surface and the rotary shaft 10 and the rotary shaft 10 and the pad surface 62 at the pivot position P2 are allowed to be the same and the gaps are used as a reference. By the reference being used as a premise and the gap at a part other than the pivot position P2 on the pad surface 62 being smaller than the reference, it is possible to more appropriately manage the gap as the entire bearing pad 60 during the operation.

The dimension of the gap between the guide metal 40 and the rotary shaft 10 and the gap during the assembly of the bearing pad 60 are set to Cr, that is, not changed from what corresponds to the related art. Accordingly, it is possible to suppress a rise in oil film temperature attributable to gap reduction.

Second Embodiment

Figure 5:
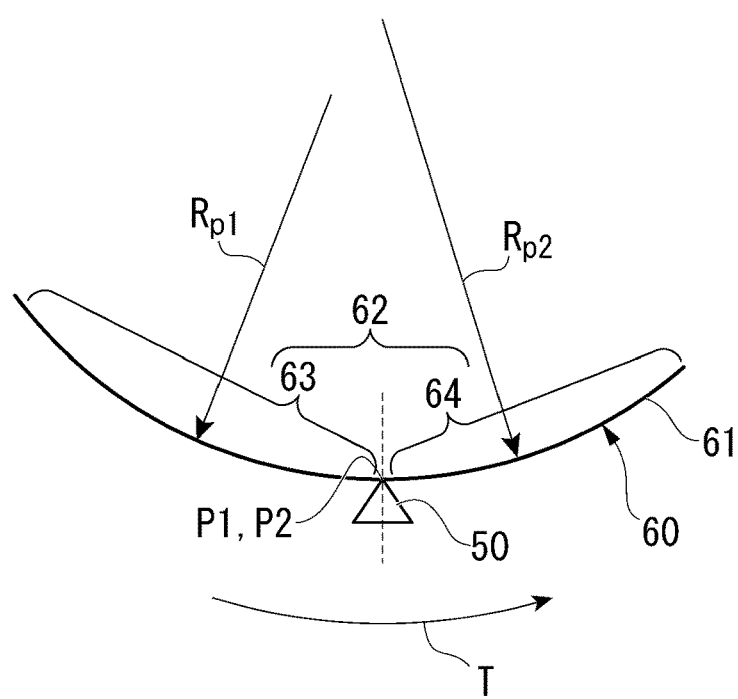
FIG. 5 is a schematic cross-sectional view orthogonal to an axial line of a pad surface of a journal bearing according to a second embodiment.

Next, a second embodiment of the present invention will be described with reference to FIG. 5. In the second embodiment, components similar to those of the first embodiment are denoted by the same reference numerals without redundant description.

The second embodiment is different from the first embodiment in the configuration of the bearing pad 60. In other words, the bearing pad 60 of the second embodiment has the back surface 61 similar to the back surface 61 of the first embodiment and the back surface 61 is supported by the pivot 50. The point of support by the pivot 50 is closer to the front side in the rotation direction T than the circumferential middle of the bearing pad 60. Accordingly, the pivot point P1 and the pivot position P2 are points closer to the front side in the rotation direction T than the circumferential middle of the bearing pad 60.

The pad surface 62 of the bearing pad 60 of the second embodiment is divided into an upstream side pad surface 63 and a downstream side pad surface 64 with the pivot position P2 as a boundary. In other words, the region that is closer to the rear side in the rotation direction T than the pivot 50 position on the pad surface 62 is the upstream side pad surface 63 and the region that is downstream of the pivot 50 position on the pad surface 62 is the downstream side pad surface 64. The upstream side pad surface 63 has a relatively long distance from the pivot position P2 to the circumferential end part (rear side in the rotation direction T, upstream side end part) and the downstream side pad surface 64 has a short distance from the pivot position P2 to the circumferential end part (front side in the rotation direction T, downstream side end part).

When the radius of curvature of the upstream side pad surface 63 is Rp1 and the radius of curvature of the downstream side pad surface 64 is Rp2 in the second embodiment, the relationship of Rp1<Rp2 is established in the present embodiment.

The pad surface 62 becomes more likely to be deformed and opened as the bearing pad 60 is circumferentially separated from the pivot position P2. Accordingly, it is possible to avoid extreme opening of the upstream side pad surface 63 by allowing the radius of curvature of the downstream side pad surface 64 having a small distance from the pivot position P2 to the circumferential end part to exceed the radius of curvature of the upstream side pad surface 63 having a large distance from the pivot position P2 to the circumferential end part. As a result, it is possible to appropriately set the gap between the rotary shaft 10 and the pad surface 62 as the entire bearing pad 60 during the operation.

Third Embodiment

Figure 6:
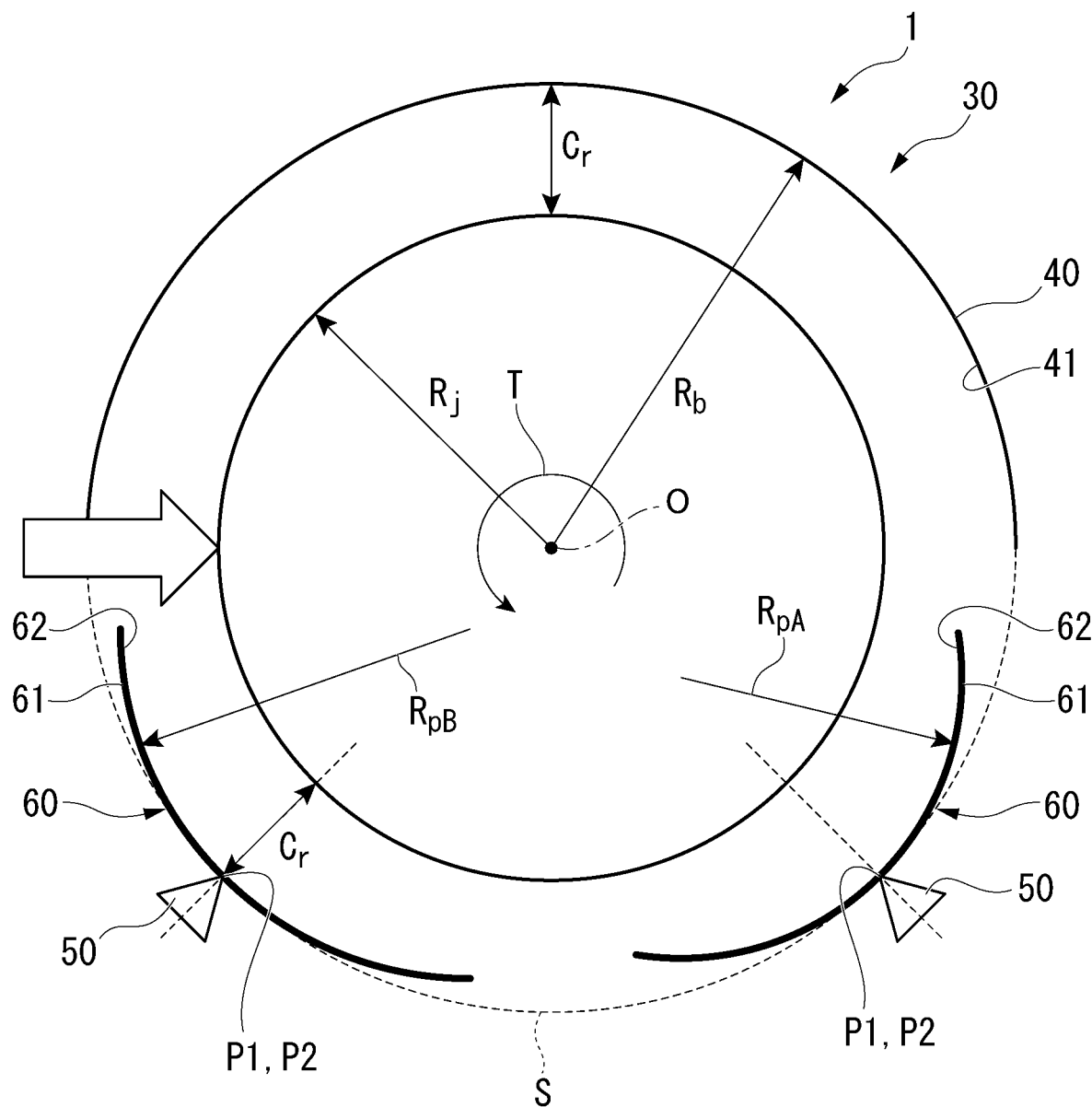
FIG. 6 is a schematic cross-sectional view orthogonal to an axial line of a journal bearing according to a third embodiment.

Next, a third embodiment of the present invention will be described with reference to FIG. 6. In the third embodiment, components similar to those of the first embodiment are denoted by the same reference numerals without redundant description.

In the third embodiment, the relationship of RpA<RpB is established when the radius of curvature of one bearing pad 60 having a large load from the rotary shaft 10 is RpA and the curvature of the other bearing pad 60 having a small load from the rotary shaft 10 is RpB.

In the third embodiment, steam is introduced from a circumferential part of the steam turbine 1. Specifically, steam is introduced from the bearing pad 60 side on the rear side in the rotation direction T. Accordingly, the load applied to the bearing pad 60 on the front side in the rotation direction T is larger than the load applied to the bearing pad 60 on the rear side in the rotation direction T.

In the third embodiment, in contrast, the radius of curvature RpB of the pad surface 62 of the bearing pad 60 on the front side in the rotation direction T is set so as to be larger than the radius of curvature RpA of the pad surface 62 of the bearing pad 60 on the rear side in the rotation direction T.

Here, of the pair of bearing pads 60, one to which a larger load is applied undergoes more elastic deformation and thermal deformation than the other. Accordingly, among the plurality of bearing pads, by setting a smaller radius of curvature for the bearing pad 60 large in load and more likely to deform, it is possible to avoid the gap between the bearing pad 60 and the rotary shaft 10 becoming excessively large.

As a result, it is possible to more appropriately manage the gap between the rotary shaft 10 and the bearing pad 60 as the entire journal bearing 30.

Although embodiments of this invention have been described above, the present invention is not limited thereto and can be appropriately modified without departing from the technical concept of the invention.

For example, although a point where the bearing pad 60 is supported by the point contact of the pivot 50 has been described in the above embodiments, the present invention is not limited thereto.

For example, a configuration in which the tip of the pivot 50 extends in the axial line O direction and the bearing pad 60 is supported by line contact may be adopted.

It is a matter of course that "point contact" and "line contact" are mutually relative expressions and do not mean point contact and line contact in strict sense.

In addition, the bearing pad 60 may be supported by another configuration and without being limited to the pivot 50 insofar as the bearing pad 60 can be pivotably supported.

Although it has been described in the third embodiment that the load on each bearing pad 60 varies with the direction in which steam is introduced, the present invention is not limited thereto and the above configuration is applicable even in a case where the load on one of the bearing pads 60 increases due to the mechanical and structural characteristics of the steam turbine 1.

Although an example in which the present invention is applied to the steam turbine 1 as a rotary machine has been described in the above embodiments, the present invention is not limited thereto. For example, the present invention may be applied to other rotary machines such as gas turbines and compressors.

INDUSTRIAL APPLICABILITY

The present invention is applicable to bearing devices and rotary machines.

REFERENCE SIGNS LIST

1 Steam turbine (rotary machine)
2 Turbine casing
3 Stator vane
4 Rotor blade
10 Rotary shaft
11 Thrust collar
20 Bearing part
21 Thrust bearing
30 Journal bearing (bearing device)
31 Carrier ring
40 Guide metal
41 Facing surface
50 Pivot (support part)
60 Bearing pad
61 Back surface
62 Pad surface
62 Pad surface
63 Upstream side pad surface
64 Downstream side pad surface
70 Lubricant supply nozzle
P1 Pivot point
P2 Pivot position
O Axial line
T Rotation direction
S Reference circle

What is claimed is:
1. A bearing device comprising:
   a bearing pad having a pad surface configured to support, via an oil film, an outer circumferential surface of a rotary shaft configured to rotate around an axial line; and
   a support part supporting the bearing pad so as to be swingable at a pivot position,
   wherein:
   a relationship of $Rj<Rp<Rb$ is established where a radius of curvature of the rotary shaft is Rj, a radius of curvature of the pad surface is Rp, and a radius of curvature of a reference circle centered at the axial line and having a radius equal to a distance between the axial line and the pivot position on the pad surface is Rb; and a dimension of a gap between the pad surface and the outer circumferential surface of the rotary shaft decreases as a distance increases from the pivot position in a circumferential direction.

2. The bearing device according to claim 1, wherein the dimension of the gap between the pad surface and the outer circumferential surface of the rotary shaft is a maximum at the pivot position.

3. The bearing device according to claim 1, further comprising a guide metal having a guide surface extending along the reference circle,
wherein a dimension of a gap between the guide metal and the outer circumferential surface of the rotary shaft is equal to the dimension of the gap between the pad surface and the outer circumferential surface of the rotary shaft at the pivot position.

4. A rotary machine comprising:
the bearing device according to claim 1; and
the rotary shaft,
wherein the bearing device supports the rotary shaft so as to be rotatable around the axial line.

5. A bearing device comprising:
a bearing pad having a pad surface configured to support, via an oil film, an outer circumferential surface of a rotary shaft configured to rotate around an axial line; and
a support part supporting the bearing pad so as to be swingable at a pivot position,
wherein:
a relationship of $Rj<Rp<Rb$ is established where a radius of curvature of the rotary shaft is Rj, a radius of curvature of the pad surface is Rp, and a radius of curvature of a reference circle centered at the axial line and having a radius equal to a distance between the axial line and the pivot position on the pad surface is Rb;
the pivot position is closer to a front side in a rotation direction of the rotary shaft than a center of the pad surface in a circumferential direction; and
a relationship of $Rp1<Rp2$ is established where a radius of curvature of an upstream part of the pad surface closer to a rear side in the rotation direction of the rotary shaft than the pivot position is Rp1 and a radius of curvature of a downstream part of the pad surface closer to the front side in the rotation direction of the rotary shaft than the pivot position is Rp2.

6. A bearing device comprising:
two bearing pads, each having a pad surface configured to support, via an oil film, an outer circumferential surface of a rotary shaft configured to rotate around an axial line; and
two support parts supporting the two bearing pads, respectively, so as to be swingable at respective pivot positions,
wherein:
for each of the two bearing pads, a relationship of $Rj<Rp<Rb$ is established where a radius of curvature of the rotary shaft is Rj, a radius of curvature of the pad surface is Rp, and a radius of curvature of a reference circle centered at the axial line and having a radius equal to a distance between the axial line and the pivot position on the pad surface is Rb;
the two bearing pads are at different circumferential positions; and
a relationship of $RpA<RpB$ is established where a radius of curvature of a first of the two bearing pads having a larger load from the rotary shaft is RpA and a radius of curvature of a second of the two bearing pads having a smaller load from the rotary shaft is RpB.

* * * * *